(12) United States Patent
Huang

(10) Patent No.: US 8,999,181 B2
(45) Date of Patent: Apr. 7, 2015

(54) METHOD FOR MANUFACTURING RIDGE-TYPE WAVEGUIDE

(71) Applicant: Hon Hai Precision Industry Co., Ltd., New Taipei (TW)

(72) Inventor: Hsin-Shun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/905,157

(22) Filed: May 30, 2013

(65) Prior Publication Data

US 2014/0166614 A1 Jun. 19, 2014

(30) Foreign Application Priority Data

Dec. 14, 2012 (TW) .............................. 101147565 A

(51) Int. Cl.
*G02B 6/10* (2006.01)

(52) U.S. Cl.
CPC ........................................ *G02B 6/10* (2013.01)

(58) Field of Classification Search
None
See application file for complete search history.

(56) References Cited

U.S. PATENT DOCUMENTS

| | | | |
|---|---|---|---|
| 6,856,746 B2* | 2/2005 | Burrows et al. | 385/132 |
| 2005/0265663 A1* | 12/2005 | Maruyama et al. | 385/47 |
| 2008/0291951 A1* | 11/2008 | Konttinen et al. | 372/21 |
| 2009/0116802 A1* | 5/2009 | Kondou et al. | 385/129 |
| 2013/0322823 A1* | 12/2013 | Huang | 385/42 |

* cited by examiner

*Primary Examiner* — Allan Olsen
(74) *Attorney, Agent, or Firm* — Novak Druce Connolly Bove + Quigg LLP

(57) ABSTRACT

In a method for manufacturing a ridge-type waveguide, a substrate is provided. An etching resistance stripe is coated on the substrate. The substrate with the etching resistance stripe is subjected to a wet etching process to form a ridge under the etching resistance stripe. The etching resistance stripe is removed. A titanium stripe is then coated onto the ridge and diffused into the ridge to form a waveguide in the ridge by a high temperature diffusing process.

13 Claims, 10 Drawing Sheets

METHOD FOR MANUFACTURING RIDGE-TYPE WAVEGUIDE

BACKGROUND

1. Technical Field

The present disclosure relates to integrated optics and, particularly, to a method for manufacturing a ridge-type waveguide.

2. Description of Related Art

At present, to manufacture a ridge-type waveguide, a substrate is first subjected to a reactive-ion etching process to produce a ridge on the substrate and then a waveguide is formed in the ridge. However, efficiency and quality of the reactive-ion etching process are often less than satisfactory.

Therefore, it is desirable to provide a method for manufacturing a ridge-type waveguide, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

A method for manufacturing a ridge-type waveguide includes steps S01 through S10.

Figure 1:
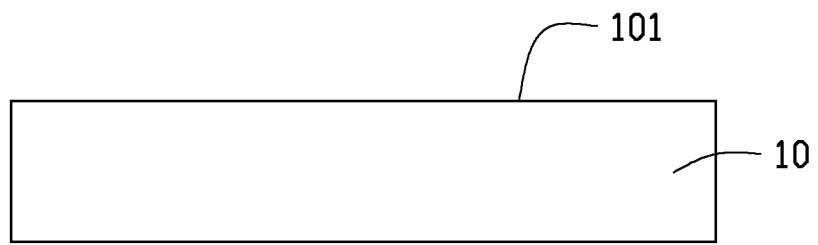
FIGS. 1-10 are schematic views showing the stages of manufacture of a ridge-type waveguide using a method in accordance with an embodiment.

Referring to FIG. 1, in step S01, a substrate 10 is provided. The substrate 10 is substantially rectangular and is made of lithium niobate crystal.

Figure 2:
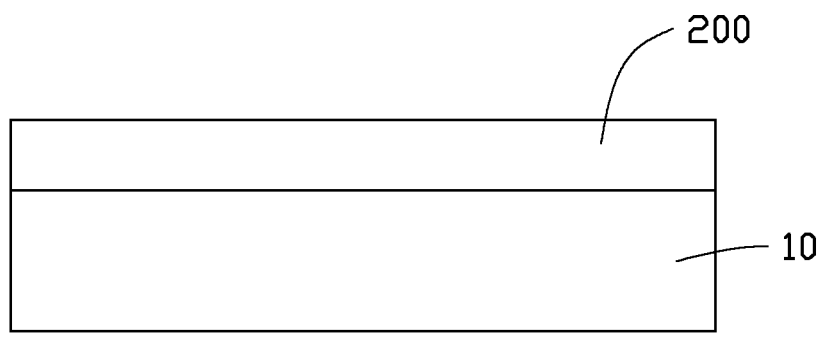
Figure 3:
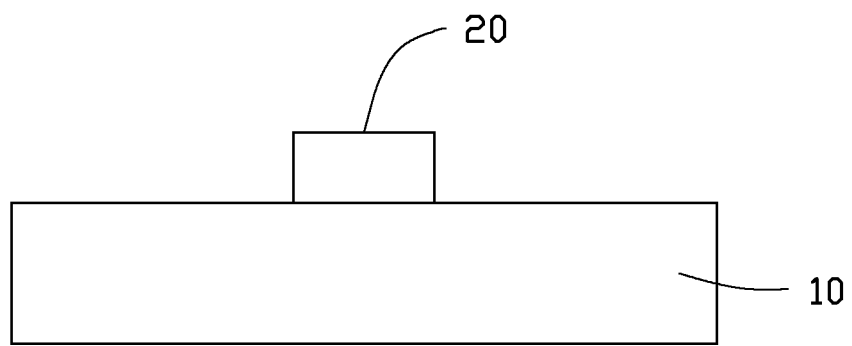

Referring also to FIGS. 2-3, in step S02, an etching resistance stripe 20 is coated on the substrate 10. The substrate 10 includes a top surface 101. The etching resistance stripe 20 extends lengthwise along the substrate 10 and is positioned generally at a centerline of the top surface 101. The etching resistance stripe 20 can be made of chromium. In one embodiment, an etching resistance layer 200 can be first coated on the top surface 101 and a photolithography process is performed on the etching resistance layer 200 to produce the etching resistance stripe 20.

Figure 4:
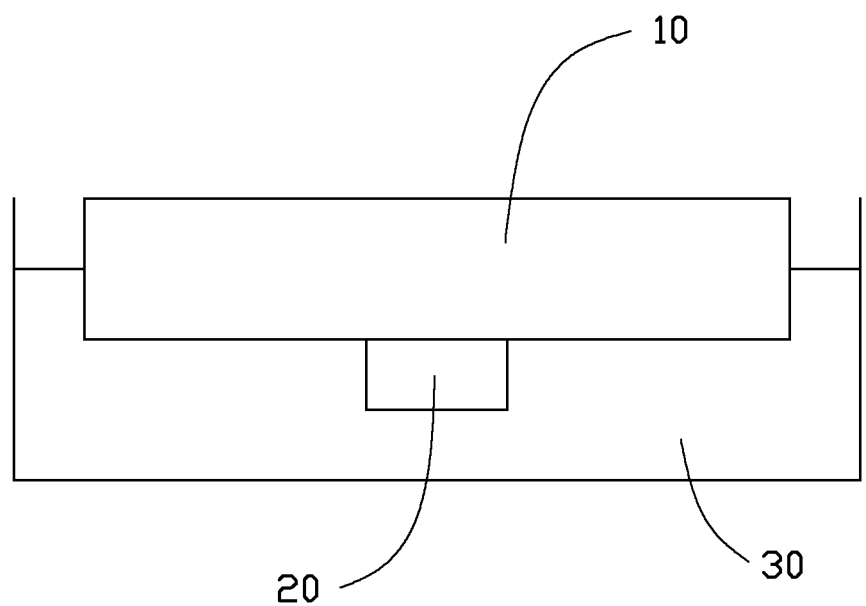
Figure 5:
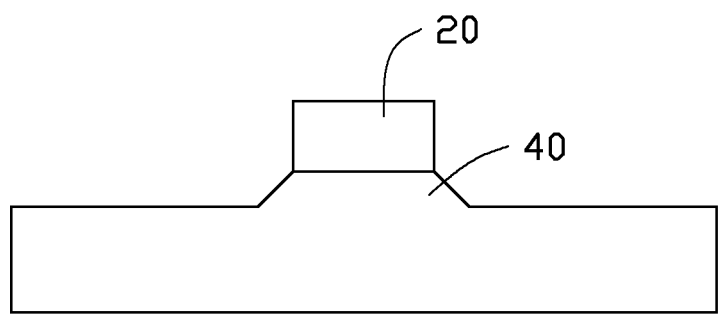

Referring to FIGS. 4-5, in step S03, the substrate 10 with the etching resistance stripe 20 is dipped into a first etchant 30 to form a ridge 40 using a first wet etching process. In detail, the first etchant 30 can erode the substrate 10 but not the etching resistance stripe 20. In this embodiment, the first etchant 30 is hydrofluoric acid. As such, parts of the substrate 10 at opposite sides of the etching resistance stripe 20 are etched while the parts of the substrate 10 covered by the etching resistance stripe 20 are not etched. The first wet etching process lasts about 4 hours and an etching depth into the top surface 101 is about 2-3 microns.

Figure 6:
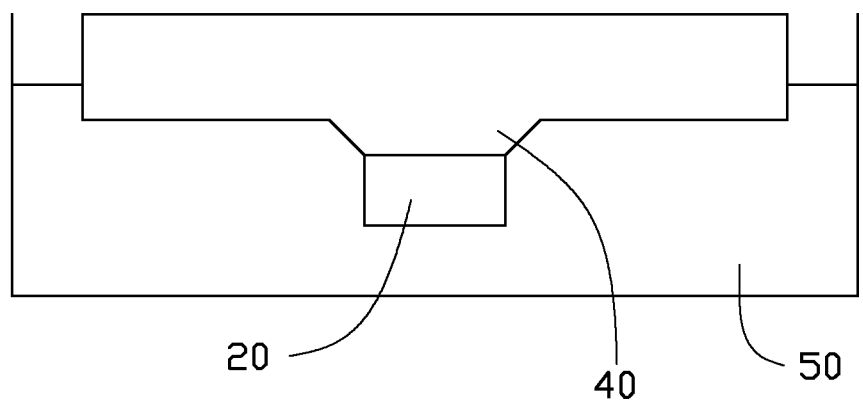
Figure 7:
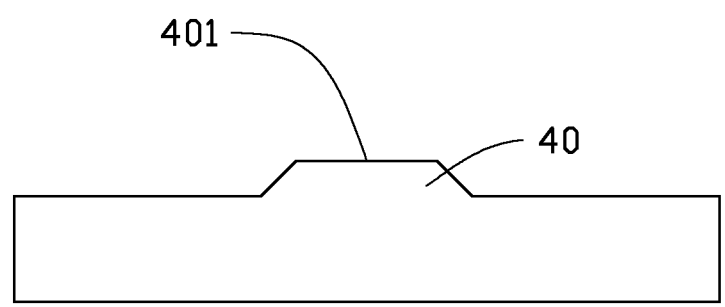

Referring to FIGS. 6-7, in step S04, the etching resistance stripe 20 is removed using a second wet etching process. In particular, the ridge 40 with the etching resistance stripe 20 is dipped into a second etchant 50. The second etchant 50 cannot erode the ridge 40 but can erode the etching resistance stripe 20. In the embodiment, the second etchant 50 contains nitric acid and the second wet etching process lasts about 10-20 minutes.

Figure 8:
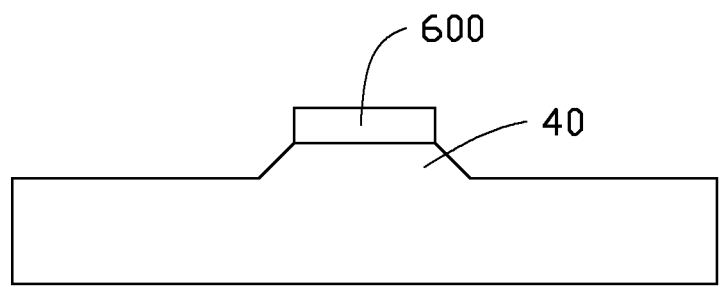
Figure 9:
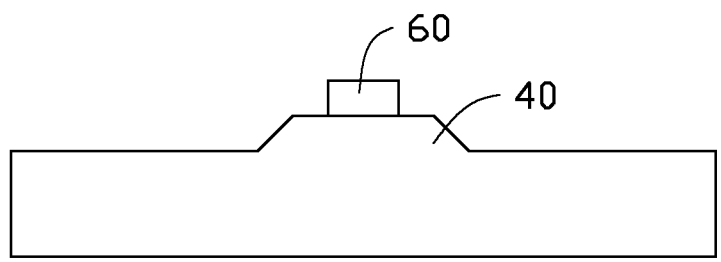

Referring to FIGS. 8-9, in step S05, a titanium stripe 60 is coated on the ridge 40. The ridge 40 includes an upper surface 401 (see FIG. 7). The titanium stripe 60 extends lengthwise along the ridge 40 and is positioned generally at a centerline of the upper surface 401. In particular, a titanium layer 600 can be first coated on the top surface 101 and a photolithography process is performed on the titanium layer 600 to produce the titanium stripe 60.

Figure 10:
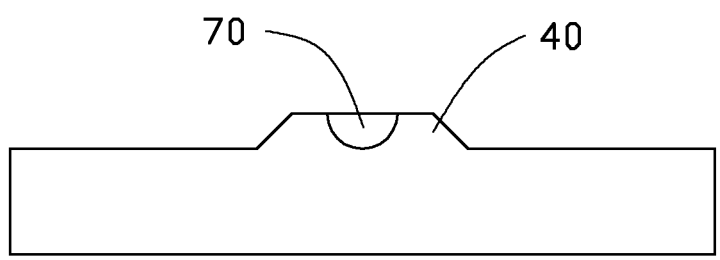

Referring to FIG. 10, in step S06, the titanium stripe 60 is diffused into the ridge 40 to form a waveguide 70 in the ridge 40 by a high temperature diffusing process. In the high temperature diffusing process, a selected temperature is about 1020 degrees Celsius and duration is about 10-20 minutes.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A method for manufacturing a ridge-type waveguide, the method comprising:
    providing a substrate made of lithium niobate crystal;
    coating an etching resistance stripe on the substrate;
    dipping the substrate with the etching resistance stripe into a first etchant to form a ridge under the etching resistance stripe using a first wet etching process;
    removing the etching resistance stripe;
    coating a titanium stripe on the ridge; and
    diffusing the titanium stripe into the ridge to form a waveguide in the ridge by a thermal diffusing process at a selected temperature.

2. The method of claim 1, wherein the substrate is substantially rectangular and comprises a rectangular top surface, the etching resistance stripe extends along a length direction of the substrate and is positioned generally at a central part of a width direction of the top surface.

3. The method of claim 1, wherein the etching resistance stripe is made of chromium.

4. The method of claim 1, wherein the step of coating the etching resistance stripe comprises:
    coating an etching resistance layer on the top surface; and
    performing a photolithography process to the etching resistance layer to produce the etching resistance stripe.

5. The method of claim 1, wherein the first etchant is hydrofluoric acid.

6. The method of claim 1, wherein the first wet etching process lasts about 4 hours and an etching depth into the top surface is about 2-3 microns.

7. The method of claim 1, wherein the step of removing the etching resistance stripe comprises:
    dipping the ridge with the etching resistance stripe into a second etchant to remove the etching resistance stripe using a second wet etching process.

8. The method of claim 7, wherein the second etchant contains nitric acid.

9. The method of claim 7, wherein the second wet etching process lasts about 10-20 minutes.

10. The method of claim 1, wherein the ridge comprises a rectangular upper surface, the titanium stripe extends along a length direction of the ridge and is positioned generally at a central part of a width direction of the upper surface.

11. The method of claim 1, wherein the step of coating the titanium stripe comprises:
   coating a titanium layer on the ridge; and
   performing a photolithography process to the titanium layer to produce the titanium stripe.

12. The method of claim 1, wherein the selected temperature of the thermal diffusing process is about 1020 degrees Celsius.

13. The method of claim 1, wherein the thermal diffusing process lasts about 10-20 minutes.

* * * * *